United States Patent
Rittner et al.

(10) Patent No.: US 9,934,686 B2
(45) Date of Patent: Apr. 3, 2018

(54) POSITION INFORMATION STORED BY TRANSPONDER

(71) Applicant: Airbus Operations GmbH, Hamburg (DE)

(72) Inventors: Ulrich Rittner, Hamburg (DE); Thilo Gierszewski, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/700,644

(22) Filed: Apr. 30, 2015

(65) Prior Publication Data
US 2015/0317903 A1 Nov. 5, 2015

(30) Foreign Application Priority Data
Apr. 30, 2014 (DE) .................. 10 2014 006 309

(51) Int. Cl.
| | | |
|---|---|---|
| G08B 21/00 | (2006.01) | |
| G08G 1/123 | (2006.01) | |
| G07C 5/00 | (2006.01) | |
| G06Q 10/06 | (2012.01) | |
| G06Q 50/30 | (2012.01) | |
| H01Q 1/36 | (2006.01) | |
| G06F 21/00 | (2013.01) | |
| G06Q 10/00 | (2012.01) | |

(52) U.S. Cl.
CPC ............ *G08G 1/123* (2013.01); *G06Q 10/06* (2013.01); *G06Q 50/30* (2013.01); *G07C 5/008* (2013.01)

(58) Field of Classification Search
CPC ........ G08G 1/123; G06Q 10/06; G06Q 50/30; G07C 5/008
USPC ....................................... 340/945
See application file for complete search history.

(56) References Cited

U.S. PATENT DOCUMENTS

| | | | |
|---|---|---|---|
| 2005/0162396 A1* | 7/2005 | Meckesheimer | G09F 9/372 345/169 |
| 2006/0032979 A1* | 2/2006 | Mitchell | B64D 11/00 244/118.6 |
| 2006/0186714 A1 | 8/2006 | Terno et al. | |

(Continued)

FOREIGN PATENT DOCUMENTS

| | | |
|---|---|---|
| DE | 10334462 | 3/2005 |
| DE | 102006030193 | 1/2008 |

(Continued)

OTHER PUBLICATIONS

German Search Report, dated Apr. 30, 2014.

*Primary Examiner* — Jack K Wang
(74) *Attorney, Agent, or Firm* — Greer, Burns & Crain, Ltd.

(57) ABSTRACT

A cladding element configured to clad a structural element disposed in a vehicle. The cladding element comprises a transponder. An item of position information, indicating the position of the structural element is stored by the transponder. A method is provided comprising reading out the position information from the transponder of such a cladding element. A computer program is provided for executing and/or controlling the method. Apparatuses for executing and/or controlling the method are disclosed. A vehicle is disclosed having such a cladding element as is a system comprising such a cladding element and such an apparatus.

17 Claims, 2 Drawing Sheets

(56) References Cited

U.S. PATENT DOCUMENTS

| | | | |
|---|---|---|---|
| 2007/0061847 A1* | 3/2007 | Callahan | B64D 11/0015 725/76 |
| 2007/0114280 A1 | 5/2007 | Coop et al. | |
| 2007/0232164 A1 | 10/2007 | Swan et al. | |
| 2012/0053779 A1 | 3/2012 | Fischer | |
| 2013/0053779 A1 | 2/2013 | Shelton, IV | |
| 2013/0307671 A1 | 11/2013 | Hino et al. | |
| 2014/0039717 A1 | 2/2014 | Henkel | |
| 2015/0012307 A1* | 1/2015 | Moss | G06Q 10/02 705/5 |
| 2015/0120340 A1* | 4/2015 | Cheatham, III | G06Q 10/02 705/5 |
| 2015/0248660 A1* | 9/2015 | Muirhead | B64D 11/0015 705/39 |

FOREIGN PATENT DOCUMENTS

| | | |
|---|---|---|
| DE | 102007055091 | 5/2009 |
| DE | 102010035374 | 3/2012 |
| EP | 2423108 | 2/2012 |
| EP | 2667324 | 11/2013 |
| EP | 2679503 | 1/2014 |
| EP | 2693406 | 2/2014 |

* cited by examiner

POSITION INFORMATION STORED BY TRANSPONDER

CROSS-REFERENCES TO RELATED APPLICATIONS

This application claims the benefit of the German patent application No. 10 2014 006 309.7 filed on Apr. 30, 2014, the entire disclosures of which are incorporated herein by way of reference.

BACKGROUND OF THE INVENTION

The present disclosure relates in general to position information that indicates the position of a structural element disposed in a vehicle.

Specifically, the present disclosure relates, inter alia, to a cladding element comprising a transponder, an item of position information being stored by the transponder. The disclosure additionally relates, inter alia, to a vehicle having such a cladding element, a method comprising reading out the position information from the transponder, a corresponding computer program, corresponding apparatuses, and a system comprising such a cladding element and such an apparatus.

Vehicles nowadays have a multiplicity of built-in components. In vehicles for passenger transport, in particular, it is often the case that multiples of a component of a particular type are built in, e.g., respectively one for each of the possible passengers. If information relating to a particular component disposed in the vehicle is to be logged or stored, this particular component may be identified on the basis of its position.

EP 2 693 406 A2 and US 2014/0039717 A1 disclose a system for documenting the status of a component on board a means of transport. Multimedia information concerning the status of the component is logged by means of a mobile recording device. By means of a transmission arrangement, the recorded items of multimedia information can then be communicated to a central logbook arrangement, such that a multimedia logbook entry can be generated there in order to document the status of the component. The mobile recording device may have a locating arrangement for determining the position of the mobile recording device and/or for determining the position of the component. Position determination may be satellite-based, for example. The position data may likewise be transmitted to the central logbook arrangement. The mobile recording device may have an identification arrangement for identifying the component. For example, a code that designates the component may be read out from an RFID transponder, and the component identified on the basis of the read-out code. The information concerning the identified component can be integrated into the recorded multimedia status information, and likewise communicated to the central logbook arrangement. The multimedia logbook entry can thus be used to log the component at which the status information was recorded.

DE 10 2010 035 374 A1 and EP 2 423 108 A2 and US 2013/0053779 A1 disclose a system for collecting defect data of structural elements in a passenger cabin of a vehicle. Provided for this purpose is a locating arrangement, which is configured to determine a position of a structural element in three-dimensional space. The locating arrangement may have, for example, a series of base stations, fixedly disposed in a passenger cabin, which are configured to enable the position of a pointing arrangement to be ascertained. For this purpose, the locating arrangement may use measurement of differences in propagation times of signals exchanged between the individual base stations and the pointing arrangement. Following ascertainment of a defect of a structural element, the respective structural element is located by means of the locating arrangement. The latter forwards the located position of the structural element to the structural-element identification arrangement. There, the identification of the respective structural element is obtained from its three-dimensional position, by means of a structural-element identification database. Furthermore, RFID transponders containing structural-element identification data may be provided for structural elements. In addition to the structural-element identification based on the three-dimensional position determination based on propagation time, by means of the pointing arrangement, the structural-element identification data of the transponders of nearby structural elements may be read out, in order to improve the structural-element identification.

Against this background, it is desirable that it is easy to provide and log an item of position information for a component disposed in a vehicle.

SUMMARY OF THE INVENTION

Disclosed according to a first aspect is a cladding element, which is configured to clad a structural element disposed in a vehicle, the cladding element including a transponder, and an item of position information, indicating the position of the structural element, being stored by the transponder.

Disclosed according to a second aspect is a method comprising reading out the position information from the transponder of a cladding element according to the first aspect. The method may be executed, for example, by one apparatus or by a plurality of apparatuses.

An embodiment of a method according to the second aspect may thus comprise reading out an item of position information, indicating the position of the structural element that is stored by a transponder of a cladding element that is configured to clad a structural element disposed in a vehicle.

Disclosed according to a third aspect is a computer program, comprising program instructions that cause a processor to execute and/or control the method according to the second aspect, when the computer program is running on the processor.

In this specification, a processor is to be understood to mean, inter alia, control units, microprocessors, micro-control units such as microcontrollers, digital signal processors (DSP), application-specific integrated circuits (ASICs) or field-programmable gate arrays (FPGAs). In this case, either all steps of the method may be controlled, or all steps of the method may be executed, or one or more steps may be controlled and one or more steps may be executed. The computer program may be distributable, for example, via a network such as the Internet, a telephone or mobile radio telephony network and/or a local network. The computer program may be, at least partially, software and/or firmware of a processor. Equally, it may be implemented, at least partially, as hardware. The computer program may be stored, for example, on a computer-readable storage medium, e.g., a magnetic, electrical, electromagnetic, optical and/or other type of storage medium. The storage medium may be, for example, part of the processor, for example a (non-volatile or volatile) program memory of the processor, or a part thereof.

Computer programs that realize applications for the use of mobile terminal devices, e.g., smartphones or tablet PCs, are often also referred to as apps. The computer program according to the third aspect may be an app.

Disclosed according to a fourth aspect is an apparatus configured to execute and/or control the method according to the second aspect or comprising respective means for executing and/or controlling the steps of the method according to the second aspect.

The apparatus may comprise, for example, means for reading out the position information. For example, this/these may be constituted by one or more processors, or comprise one or more processors.

Disclosed according to a fifth aspect is an apparatus that comprises at least one processor and at least one memory, which contains program code, the memory and the program code being configured to cause the apparatus having the at least one processor to execute and/or control the method according to the second aspect of the disclosure. In this case, either all steps of the method may be controlled, or all steps of the method may be executed, or one or more steps may be controlled and one or more steps may be executed.

Disclosed according to a sixth aspect is a vehicle having a cladding element according to the first aspect.

Disclosed according to a seventh aspect are a system comprising a cladding element according to the first aspect and an apparatus according to the fourth aspect or according to the fifth aspect.

In the following, for reasons of clarity, the present disclosure is described with primary focus on the first aspect and the second aspect, the following explanations being applicable analogously to the third to seventh aspects.

Since the cladding element configured to clad the structural element comprises the transponder, and the position information indicating the position of the structural element is stored by the transponder, the transponder—and therefore the position information—can easily be provided close to the structural element. For this purpose, for example, the cladding element can be applied to the structural element, such that it clads the structural element.

For the purpose of logging position information close to the structural element, a device configured to read out the position information, e.g., an apparatus according to the fourth or fifth aspect, may be brought close to the cladding element. The logging of the position information in relative spatial proximity to the cladding element, and therefore to the structural element, can be intuitively comprehensible to a person charged with the logging operation. It can therefore be insusceptible to error.

The position information may indicate, not only the position of the structural element, but also give an indication of the position of a component, disposed in the vehicle, that is other than the structural element. The component may be disposed, for example, in spatial proximity to the structural element and/or, for example, may be spatially and/or functionally assigned to the same seating place or, also, adjacent seating places of the vehicle. The logging of the position information can then therefore be effected, not only close to the structural element, but close to the component at the same time. Moreover, in the case of approximate position information, for example, the position information can indicate both the position of the structural element and the position of the component with comparable accuracy.

If the cladding element clads the structural element, the position information may be understood, not only as an indication of the position of the structural element, or component, but also as an indication of the position of the cladding element.

The position information may be used for various purposes. For example, further information relating to a structural element or relating to a component may be logged and provided, stored, transmitted or processed, correlated with the position information. The further information relating to a structural element or relating to a component may comprise, for example, an item of information relating to the status of the structural element or component. For example, this status information may indicate whether there is a defect of the structural element or component, and possibly also the nature of the defect.

Since the cladding element comprises the transponder, it is possible, with comparatively little work, to retrofit vehicles with transponders from which the respective position information can be read out. For this purpose, for example, an already existing cladding element of a respective structural element can be removed, and replaced by a cladding element according to the first aspect of the present disclosure. Similarly, equipping with transponders can also be effected in an uncomplicated manner already during the production of the vehicle, in that cladding elements according to the first aspect of the present disclosure are selected already as original cladding elements.

The vehicle may be, for example, an aircraft, e.g., an airplane, a land vehicle, e.g., a bus, or a water vehicle, e.g., a ship. The vehicle may be configured for transporting passengers. For example, a seating place may be provided for a plurality of passengers, or for each passenger, or a maximum number of passengers that can be accommodated or admitted by the vehicle—e.g., in that a corresponding number of individual seats or a correspondingly lesser number of multiple seats and/or single and multiple seats is provided.

The structural element may be, in principle, any structural element disposed in a vehicle. For example, the structural element may be a mechanical structural element or an electrical structural element. The structural element may be, for example, merely a constituent part of a device, and act in combination with at least one further constituent part of the device, in order that the device can perform its respective intended function. To cite just one further example, the device in its entirety may also be understood as a structural element within the meaning of the present disclosure.

A great variety of configurations are possible for the cladding element according to the present disclosure. Thus, such a cladding element may be made of a great variety of materials. For example, its basic material may be plastic, wood or paperboard. Differing materials may be combined for the cladding element. Also, in principle, metallic materials are not precluded for the configuration of the cladding element. It is to be noted, however, that the choice of material for the cladding element should allow the position information, stored by the transponder, to be read out largely without impairment. For this purpose, for example in the case of a transponder that can be read out by means of electromagnetic waves, the use of metallic materials for the composition of the cladding element may be limited to a small proportion of the area of the cladding element and/or to a reinforcing element of the cladding element, or to fastening elements for fastening the cladding element.

That the cladding element is configured to clad the structural element may mean, for example, that the cladding element is configured to cover the structural element, at least partially. In such a case, the cladding element may also be referred to as a covering or shell.

That the cladding element is configured to cover the structural element, at least partially, may have the effect that the cladding element leaves the structural element uncovered on at least one side. The cladding element may be configured, for example, to cover only one side of the structural element. The structural element may optionally be covered in another way on one further side, or on a plurality of further sides, or on all further sides—e.g., by surrounding housing or cladding elements. The arrangement by which the cladding element covers the structural element, at least partially, may include the surface of the structural element being only partially covered on one or more sides of the structural element that are covered by the cladding element. Alternatively, however, a respective side of the structural element may also be completely covered by the cladding element.

That the cladding element is configured to clad the structural element may mean, alternatively, for example, that the cladding element is configured to surround, e.g., to border or enclose, the structural element. In this case, the structural element need not be covered either completely or only partially. In this context, the cladding element may also be referred to as a bordering.

That the cladding element is configured to clad the structural element may include that the cladding element is configured to clad, besides the structural element, at least one further structural element or even a plurality of further structural elements.

In order to clad the structural element, the cladding element may be provided with at least one connecting element that enables the covering to be connected to the structural element itself or to a component that is close to the structural element. The cladding element may be such that it can either be mounted in a detachable, and possibly re-connectable, manner, in a position in which it clads the structural element, or also fixed permanently in such a position, e.g., adhesive-bonded, such that it is not easily detachable from this position, and such that attempted separation of the cladding element is possibly even likely to result in it being damaged or destroyed.

Transponders of various types are possible as the transponder for the cladding element. For example, the transponder may be a passive transponder. The passive transponder may be configured to derive the energy necessary for its operation from a device that is configured to read out information from the transponder and/or to transmit an item of information to the transponder. For example, the transponder may derive the required energy from an electromagnetic field generated by such a device. On the other hand, the transponder may also be an active transponder. The active transponder may comprise an energy supply that is configured to provide energy required for operation of the transponder. For example, for this purpose an active transponder may have a battery or a capacitor. Likewise, means for connecting to an external electric power system, e.g., an onboard power system of a vehicle, may be provided.

The transponder may have a memory, in which information, e.g., the position information, may be stored. The memory may be, for example, a magnetic, electrical, electromagnetic or optical memory. The memory may be a volatile or non-volatile memory, i.e., a permanent memory. The transponder may comprise an antenna that can be used to send and/or receive information. In addition to the components already mentioned, the transponder may comprise one or more further components. For example, the transponder may comprise a control unit, for example a controller that is configured to handle communication between the transponder and an external device. A further component that may be included in the transponder, and which is mentioned here by way of example, is a processing unit, e.g., a processor, configured for the processing of data by the transponder.

That the cladding element comprises the transponder may include, for example, that the transponder is disposed, at least partially, or also completely, on a surface of the cladding element. If the transponder is disposed only partially on a surface of the cladding element, the other parts of the transponder may be disposed, for example, inside the cladding element. It is likewise possible for the transponder to be disposed completely inside the cladding element. For example, the cladding element may be provided with an opening that is configured to accommodate the entire transponder or, also, only a part of the transponder. The transponder or transponder part may also be disposed inside the cladding element directly during the process of producing the cladding element. For example, in the case of a cladding element produced by means of a casting process, the transponder can be molded-in.

The position information may indicate, for example, a position of the structural element inside the vehicle, e.g., inside a passenger compartment, in particular a passenger cabin.

That the position information indicates the position of the structural element does not necessarily require the position information to contain an exact specification of the position of the structural element. It is sufficient if the position information contains an indication, of the position of the structural element that may be of limited accuracy.

The position information may be, for example, a one-dimensional, two-dimensional or three-dimensional item of position information.

The position information may contain an absolute specification of position, e.g., in the form of geographical coordinates. For example, the absolute specification of position may comprise a geographical width and a geographical length. In addition, for example, an altitude coordinate, e.g., an altitude above sea level, may be specified. This is then a three-dimensional specification of position.

As an alternative or in addition to an absolute specification of position, the position information may contain a relative specification of position. The relative specification of position may refer, for example, to a particular point and/or a particular object within the vehicle. In the case of a relative specification of position in the form of coordinates, this point, or this object, may constitute the origin of the coordinate system. In the case of a one-dimensional specification of position, a distance of the structural element from the reference point, for example, may constitute the position information.

Position information may be in a form other than of coordinates. As a further example, a unique designation may be assigned to each installation location for a structural element, from a given number of installation sites. The designation may be, for example, a number, a letter combination or a mixture thereof. The position information may then contain the designation corresponding to the respective installation location of the structural element.

The position information may be specific to the structural element. On the other hand, the same position information may also be assigned to a plurality of structural elements.

That the position information indicates a position of the structural element may include, as already explained, that the position information gives an indication of the position of a component that is other than the structural element. Understood as an indication of the position of the component, the position information may possibly be less precise than in respect of the identification of the position of the structural element. This need not necessarily be the case, however, for example because the position information is only approximate.

According to an embodiment, the transponder is a near-field communication transponder.

In the following, transponders for near-field communication (NFC) are generally referred to as NFC transponders. The designation NFC tag is also common, and is also used in places in the following.

The reading-out of the position information from the NFC transponder can be performed in a comparatively inelaborate manner, since there is a wide spectrum of devices that can be used for this purpose. Thus, a multiplicity of mobile telephones, specifically so-called smartphones, have the capability to communicate with NFC transponders. Operating systems for smartphones are in some cases natively equipped with corresponding program components for NFC communication. Other types of mobile devices, e.g., mobile PCs (personal computers), such as tablet PCs and notebooks or laptops, personal digital assistants (PDAs), portable games consoles, etc. are likewise in some cases also already available with NFC communication technology, or the availability of devices of this type with NFC communication technology is anticipated.

Some embodiments of apparatuses according to the fourth or fifth aspect of the present disclosure are either a constituent part of a device, of one of the aforementioned device types, e.g., a smartphone, or constitute such a device, e.g., a smartphone.

Normally, communication with an NFC transponder can be effected only with a relatively small distance between the NFC transponder and a device that constitutes the communication partner. Thus, if a device is brought close to the NFC transponder for the purpose of reading out the position information, it may therefore be relatively unlikely that, besides the position information that an operator wishes to be read out from a particular NFC transponder, position information is unintentionally read out from a further transponder that might be nearby.

NFC transponders may feature a low energy requirement.

Inexpensive NFC transponders are available in differing variants. Some of these variants may be suitable for equipping a cladding element in a particularly uncomplicated manner. For example, there are NFC transponders in the form of stickers, which can be applied both to newly produced and to already existing cladding elements, in order to constitute cladding elements according to the first aspect of the disclosure.

According to an embodiment, the vehicle is an aircraft.

In aircraft, e.g., airplanes, there are normally a multiplicity of built-in structural elements and components. Specifically, it is often the case that there are multiples of a structural element, or component, of a particular type within an aircraft. For example, respectively one structural element, or one component, of the corresponding type may be provided for many passengers, or even for each passenger, e.g., assigned to the passenger seating places. In such a scenario, the use of cladding elements according to the first aspect of the present disclosure may be particularly useful if it is to be made possible to log position information, relating to structural elements or components, in an uncomplicated and reliable manner—e.g., to enable further information, correlated with the position information, to be provided.

According to an embodiment, the structural element is assigned to a seating place of the vehicle.

Owing to the assignment of the structural element to the seating place, the position information indicating the position of the structural element can additionally provide an indication of the seating place position.

The assignment of the structural element to a seating place of the vehicle may be realized, for example, in that the structural element is spatially assigned to the seating place. For example, the structural element may be disposed in the spatial proximity to the seating place, for example at a distance of maximally one meter, in particular maximally 50 cm, specifically maximally 30 cm. The spatial assignment may also exist, for example, because the structural element is integrated in a seat that provides the seating place, for instance a seating surface, for example close to its upper or lower side, its armrest, its backrest, or its headrest.

Alternatively or additionally, the assignment of the structural element to the seating place may also be of a functional nature. Thus, for example, the assignment may include, for example, that a passenger who has occupied the seating place can use the functionality of the structural element at his/her seating place. On the other hand, if appropriate, this functionality may not be available to persons at other locations, e.g., at other seating places. For example, in a case in which the structural element is a display or constituent part of a display, e.g., a display of an onboard entertainment or onboard information system, the user at the seating place can see content displayed on the display, such that the display is functionally assigned to this seating place. Spatially, however, it may be disposed, for example, on the back side of a backrest of a seat in a seating-place row that is directly in front of the seating place in question. Just one further example for a structural element that is functionally assigned to a seating place is a light that is disposed in a passenger service unit (PSU) and that can be oriented such that it can provide reading light to a passenger sitting on the respective seating place.

According to an embodiment, the position information comprises a seating-place designation.

In the case of a structural element assigned to a seating place, if necessary the position of the structural element can be located in an uncomplicated manner by a person, by means of a seating-place designation. This may be applicable, for example, if the seating-place designation is visible within the vehicle, e.g., on a display or a sign, close to the respective seating place.

The seating-place designation may be, for example, a seating-place designation that is specific to the respective seating place. It may include, for example, a designation of a seating-place row, in which the respective seating place is disposed within the vehicle. In addition, it may comprise, for example, a specification that designates the respective seating place within its seating-place row. The designation of the seating-place row may be given, for example, in the form of a number. The designation of the seating place within the seating-place row may be given, for example, in the form of a letter. In such a case, the seating-place designation may be, for example, "3F."

However, the seating-place designation may also be more approximate than specific in respect of the seating place. For example, it may be a seating-place designation that is non-specific to the seating place. An example of this is when the seating-place designation includes only the specification of a seating-place row, but not a designation of the respective seating place within the row. In the case of a plurality of seating places with the seating-place row, the seating places of the row may have the same seating-place designation.

Apart from a seating-place designation on the basis of a seating-place row, and possibly a designation of the seating place within its seating-place row, the present disclosure also includes other seating-place designations. To cite just one further example, the seating-place designation may include, for instance, a code, for example generated randomly, that is specific to a seating place.

According to an embodiment, the transponder is disposed on an inner side of the cladding element.

Disposition of the transponder on the inner side may result in the transponder being reliably protected against external influences, e.g., mechanical action, the effect of moisture and/or dirt. At the same time, it might be the case that the transponder is disposed on the cladding element in a comparatively simple manner. This may be useful, for example, in the case of retrofitting existing cladding elements with a transponder, in order thus to create a cladding element according to the first aspect of the present disclosure, or in the case of new production of such cladding elements.

Disposition of the transponder on the inner side of the cladding element may be effected, for example, in that the transponder is bonded thereto. This may be effected, for example, by means of a separately applied adhesive. This step may be omitted if the transponder is in the form of a sticker. As an alternative or in addition to fastening by adhesive, a mounting may be provided by the cladding element, configured to receive and hold the transponder.

According to an embodiment, the transponder is integrated into the cladding element.

In this case, the transponder can be reliably protected against external influences. The integration of the transponder into the cladding element may be effected already during its production, e.g., if the cladding element is one that is configured specifically for the configuration according to the first aspect of the present disclosure.

The integration of the transponder into the cladding element may be realized, for example, in that, in the case of a cladding element produced by means of a casting method, the transponder is molded-in concomitantly. According to just one further example, the cladding element may be provided with an opening that is configured to accommodate the transponder. For the purpose of integrating the transponder into the cladding element, the transponder may be disposed in the opening.

According to an embodiment, the structural element is an electrical structural element.

An electrical structural element may be understood to mean, for example, any structural element that requires electrical energy for its operation. For example, the electrical structural element may be a constituent part of one of the following arrangements, or the electrical structural element may constitute one of the following arrangements: lighting arrangement, data transmission arrangement, e.g., data transmission connection, for example for audio and/or video signals, wire-bound or wirelessly operating energy supply arrangement, in particular direct-voltage supply arrangement or alternating-voltage supply arrangement, optical and/or acoustic indicating arrangement, etc.

According to an embodiment of a method according to the second aspect of the disclosure, the method comprises reading out the position information from the transponder of a cladding element according to the first aspect of the present disclosure.

The reading-out of the position information enables the position information to be processed further by a device by which the position information has been read out, or made available to another entity for further processing.

According to an embodiment of a method according to the second aspect of the disclosure, the method comprises assigning an item of status information, relating to a status of a component of the vehicle, to the position information.

The status information may then be provided, stored, transmitted or to be processed, correlated with the position information. The correlation of the status information and the position information may be used, for example, to locate the component, if the status information suggests that this is necessary, e.g., because it indicates a defect of the structural element, and therefore service personnel are to undertake servicing of the component.

The component of the vehicle to which the status information relates may be the structural element. However, the component may also be one that is other than the structural element and whose position is likewise indicated by the position information, e.g., because the structural element and the component are disposed spatially close to each other and/or are spatially and/or functionally assigned to the same seating place or, also, to adjacent seating places, of the vehicle.

The status information may include a multiplicity of differing items of information. It may include, for example, defect information and/or fault information. The status information may include, for example, information indicating that the structural element is soiled. However, it may also indicate that there is no impairment to the structural element. If the structural element is an electrical energy storage device, or if the structural element comprises an electrical energy storage device, the status information may include an item of information relating to a charge status of the energy storage device, etc.

The assignment of the status information to the position information may be performable, for example, by means of an embodiment of a computer program according to the third aspect of the present disclosure, an apparatus according to the fourth aspect, or an apparatus according to the fifth aspect. On the other hand, the assignment may also be effected in another way. For example, to enable the assignment to be effected, a menu may be displayed to an operator of a device that was used to read out the position information. The menu may allow the selection of the status information from a pre-compiled number of status information items, and/or the free input of the status information. Alternatively or additionally, it may also be possible to assign the position information to a component identification, or vice versa. Thus, for example, in the case of an item of position information that possibly indicates the position of differing components, it is possible to clarify which component it is to relate to in the specific case.

According to an embodiment of a method according to the second aspect of the disclosure, the method comprises initiating the output of a read-out completion signal following completion of reading-out of the position information from the transponder.

The read-out completion signal may be discerned by a person performing the reading-out of the position information. The person is thereby made aware of the completion of the reading-out operation.

The read-out completion signal may be, in particular, a read-out completion signal that is discernible by a person. The read-out completion signal may be, for example, an acoustic, visual and/or haptic signal, e.g., in the form of a vibration of a device that was used to read out the position information from the transponder.

An acoustic initiating signal may be used, for example, when a read-out device, e.g., an apparatus according to the fourth or fifth aspect of the present disclosure, is not within the field of view of the operator during the read-out operation. If the cladding element—and therefore the transponder—is located, for example, on the underside of the seating surface of a passenger seat of the vehicle, the operator may hold the read-out device, for example realized as a smartphone having special software, under the seating surface in order to read out the position information. For this purpose, a mounting of appropriate length may be provided, which is configured to be connected to the read-out device, e.g., the smartphone. The mounting may have, for example, an extension rod. An acoustic read-out completion signal may signal to the operator that the read-out operation is complete, without the necessity of the smartphone display being visible to the operator for this purpose. This may likewise be possible by means of a haptic read-out completion signal, e.g., because vibrations of the read-out device are transmitted to the operator via a mounting.

The initiation of the output of the read-out completion signal may be effected, for example, in that a corresponding activation of a component, via which the actual output of the signal is effected, is performed. This component may be, for example, part of the read-out device, for example an apparatus according to the fourth or fifth aspect of the present disclosure. For example, an activation of a loudspeaker may be effected in order to initiate the output of an acoustic read-out completion signal, such that the loudspeaker outputs the signal.

According to an embodiment of a method according to the second aspect of the disclosure, the method comprises initiating a transmission of the position information to a server.

In this way, the position information can be stored, processed and/or provided centrally there for subsequent use.

The server may be, for example, an onboard server of the vehicle, e.g., in the case of aircraft of the manufacturer Airbus, an ALNA server (ALNA=airline network architecture). The transmission may be effected, for example, in a wire-bound or wireless manner, e.g., by means of Bluetooth or WLAN (WLAN=wireless local area network). A read-out device, e.g., an exemplary embodiment of an apparatus according to the fourth or fifth aspect of the present disclosure, may be equipped with corresponding communication means for this purpose.

In addition to the position information, a component identification of a component to which the position information is assigned, and/or an item of status information assigned to the position information, may be transmitted to the server.

It is intended that the exemplary embodiments and exemplary configurations of the present disclosure that have been described above in this specification are also disclosed in all combinations with each other.

BRIEF DESCRIPTION OF THE DRAWINGS

Further exemplary configurations are given by the following detailed description of some exemplary embodiments in combination with the figures.

The figures merely serve the purpose of elucidating the embodiments. They are not true to scale, and are intended merely to reflect the general concept of the disclosure exemplarily. For example, features contained in the figures are not in any way to be deemed to be a necessary constituent part.

FIG. 1b shows a schematic representation of the back side of the cladding element from FIG. 1a;

DETAILED DESCRIPTION OF THE PREFERRED EMBODIMENTS

The figures and the description that follows are to be understood as an exemplary realization of the aspects of the disclosure described above. Even if they describe aspects of the disclosure in the context of use in the case of an airplane, other fields of application are likewise possible.

Figure 1A:
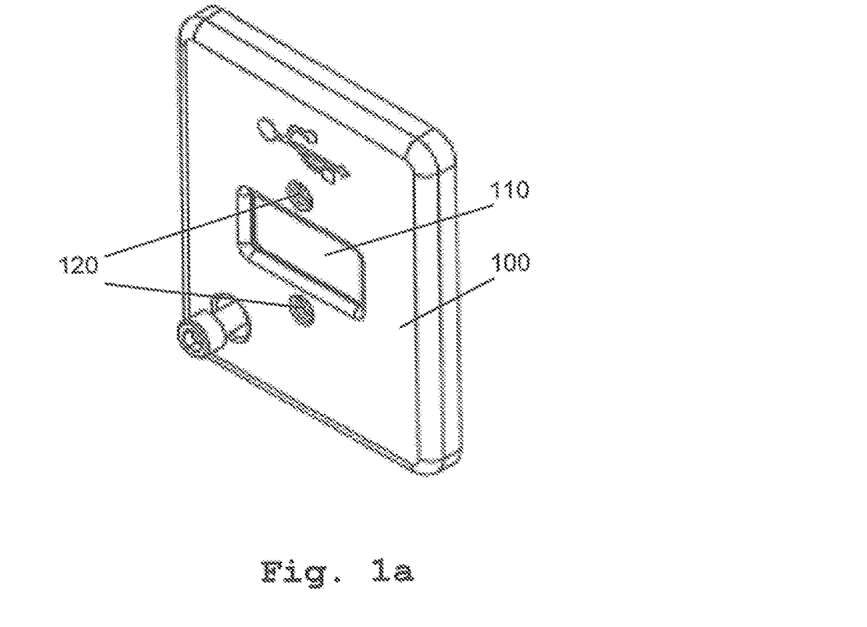
FIG. 1a shows a schematic representation of the front side of a first embodiment of a cladding element according to the first aspect of the present disclosure.

FIG. 1a shows a schematic representation of the front side of a first exemplary embodiment of a cladding element 100 according to the first aspect of the present disclosure.

The cladding element 100 is in the form of a mask, which is configured to enclose an alternating-voltage output provided at a seating place for a passenger in an airplane. The alternating-voltage output in this case is configured such that it can receive a USB connector (USB=universal serial bus). The alternating-voltage output may therefore also be referred to as a USB socket. In order that a USB connector can be connected to the USB socket, the mask 100 has an opening 110 that matches the geometry of the USB connector. Functionally, the USB socket is assigned to the seating place of a passenger, who can and may use the USB socket as prescribed. Spatially, the USB socket and the mask 100 are disposed on the back side of the backrest of a seat that is in a seating row directly in front of the seating row of the seating place to which the USB socket is assigned. The mask 100 has a pair of drilled through-holes 120, through which fastening means, e.g., screws, can be passed for the purpose of fastening the mask 100 to the back side of the backrest of the seat in front.

Figure 1B:
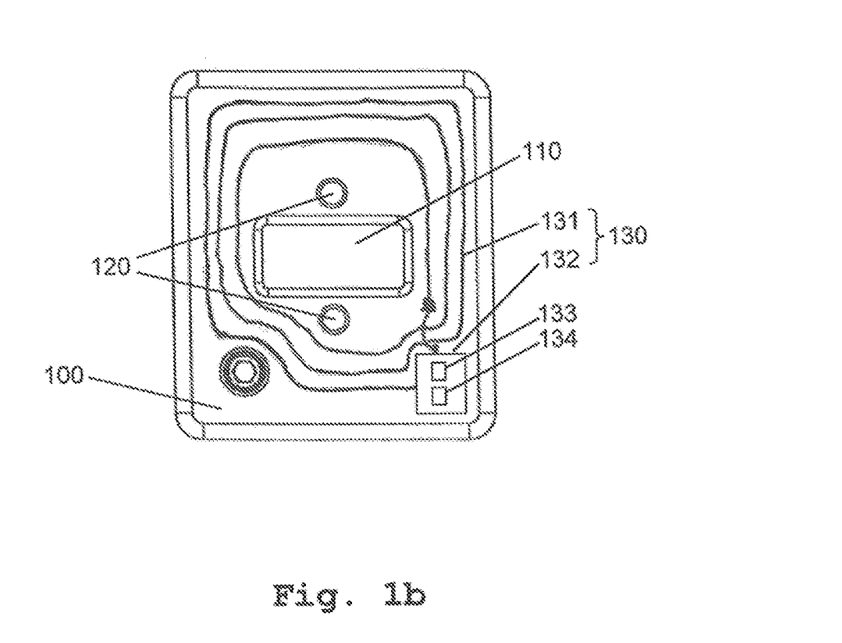

FIG. 1b shows a schematic representation of the back side of the mask 100 from FIG. 1a.

As can be seen in FIG. 1b, there is an NFC tag 130 attached on the back side, i.e., the inner side, of the mask 100. In this case, this is an NFC tag in the form of a sticker, which can thus also be applied to already existing masks, in order to convert the latter, in an inelaborate manner, into an embodiment of a cladding element according to the first aspect of the present disclosure. The NFC tag 130 comprises a coil 131 and a chip 132, which, in addition to a controller 133, comprises a memory 134. A seating-place designation of the seating place, to which the USB socket is functionally assigned, is stored as position information in the memory 134. It comprises a seating-place row and an identification of the seating place within this row. In the case of a seating place C in row 5, the seating-place designation may be, for example, "5C."

Figure 2:
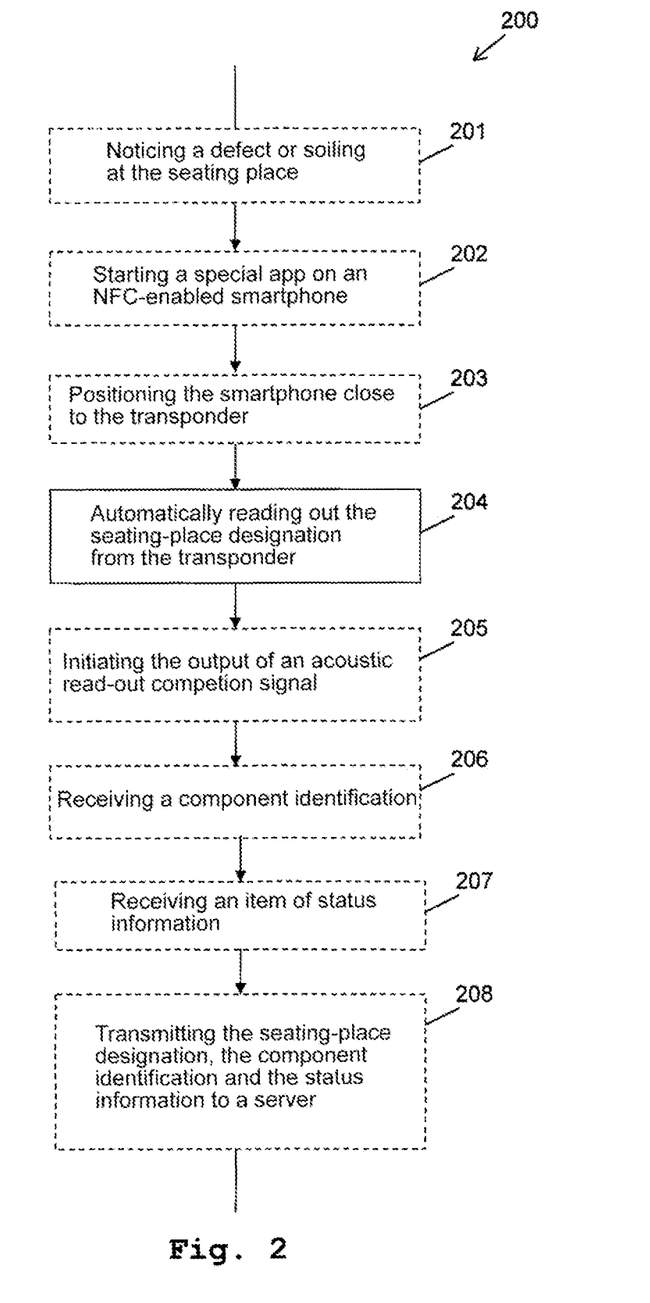
FIG. 2 shows a schematic representation of a flow diagram illustrating an embodiment of a method according to the second aspect of the present disclosure.

FIG. 2 shows a schematic representation of a flow diagram 200, which illustrates an embodiment of a method according to the second aspect of the present disclosure.

The method explained with reference to FIG. 2 is based in the context of the use of the mask 100 from FIGS. 1a and 1b. The steps 201-203 and 205-208 are optional, and are therefore enclosed by broken lines in the flow diagram 200.

Step 201 comprises that a flight attendant sees that the backrest of the seat that provides the seating place to which the USB socket is functionally assigned is defective or soiled. This fault or this soiling is to be removed by a member of the service personnel, or cleaning personnel, at a later point in time.

For this reason, the flight attendant, in step 202, starts a special app on his/her smartphone, the hardware and operating system of which are configured for near-field communication, NFC. The app is an embodiment of a computer program according to the third aspect of the present disclosure. Owing to the provision of the app on the smartphone, the smartphone has become an embodiment of an apparatus according to the fourth and/or fifth aspect of the present disclosure. The flight attendant selects a position-information log mode in a menu of the app.

In step 203, the flight attendant positions the smartphone in the immediate proximity of the mask 100, and thus of the transponder 130.

Step 204 comprises the automatic reading-out of the position information stored by the transponder, specifically in the memory 134 of the transponder 130, i.e., the seating-place designation "5C." The reading-out of the position information can thus be performed in an uncomplicated, rapid and intuitive manner, in spatial proximity to the defective or soiled seat backrest.

In step 205, the app is used to initiate the output of an acoustic read-out completion signal, which is thereupon audible via a loudspeaker of the smartphone and signals to the flight attendant that the reading-out of the position information has been successfully completed.

A menu then appears on smartphone display. It shows a predefined number of components that are present at each seating place of the aircraft. The flight attendant selects the seat backrest from the list. If, for example, there had been a fault with the USB socket that the flight attendant had wished to log, the attendant would have been able to select the USB socket here. If the attendant had wished to log status information for another component assigned to the seating place in question, the attendant would have been able to select this here.

In step 206, the smartphone app receives a component identification of the component selected by the user, in this case the seat backrest.

The app thereupon displays a field, in which the defect or the soiling of the backrest is input, as status information, in text form, by the flight attendant. Likewise conceivable is the possibility of selecting the defect or the soiling from a displayed menu.

In step 207, the app receives the status information input by the user.

The app assigns the component identification "backrest" and the status information "defective" or "soiled," received in step 207, to the seating-place designation "5C," i.e., to an item of position information indicating the position of the backrest of this seating place.

In step 208, the transmission of the position information, component identification and status information is initiated, from the smartphone, via WLAN, to an onboard server of the aircraft, e.g., in that the app initiates the transmission. The information is then available there for subsequent use.

For example, the correlated position information, component identification and status information can be read out of the onboard server at the start of an aircraft servicing and/or cleaning interval. A member of the service or cleaning personnel can thereby obtain the information that the seat backrest at seating place "5C" is defective or soiled.

Since, in the aircraft, each seating place is marked with a visual indication of its seating-place designation, the personnel member can locate the seating place in an uncomplicated and rapid manner, and remedy the defect or clean the soiling there.

The exemplary embodiments described in this specification are also intended to be disclosed in combination with each other. In particular, the description of a feature comprised by one embodiment—unless explicitly stated to the contrary—is also not to be understood here to mean that the feature is essential or substantive to the functioning of the embodiment. The sequence of the method steps described in this specification is not imperative. Alternative sequences of the method steps are conceivable. The method steps may be implemented in various ways. Thus, implementation in software (by program instructions), hardware or a combination of both is conceivable for implementation of the method steps.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A cladding element, which is configured to clad a structural element disposed in a vehicle, the cladding element including a transponder, wherein an item of position information, indicating a position of the structural element, is stored by the transponder,
   wherein the position information is transmitted via the transponder,
   wherein the structural element is assigned to a seating place of the vehicle, and
   wherein the same position information is assigned to a plurality of structural elements.

2. The cladding element according to claim 1, wherein the transponder is a near-field communication transponder.

3. The cladding element according to claim 1, wherein the vehicle is an aircraft.

4. The cladding element according to claim 1, wherein the position information comprises a seating-place identification.

5. The cladding element according to claim 1, wherein the transponder is disposed on an inner side of the cladding element or is integrated into the cladding element.

6. The cladding element according to claim 1, wherein the structural element is an electrical structural element.

7. The cladding element according to claim 1, wherein the position information comprises coordinates of the cladding element.

8. A method comprising the steps:
   providing a cladding element configured to clad a structural element disposed in a vehicle, the cladding element including a transponder, wherein an item of position information, indicating a position of the structural element, is stored by the transponder, reading out the position information from the transponder of the cladding element, and assigning an item of status information, relating to a status of a component of the vehicle, to the position information, wherein the status information indicates whether there is a defect of the structural element.

9. The method according to claim 8, further comprising the step of initiating an output of a read-out completion signal following completion of reading-out of the position information from the transponder.

10. The method according to claim 8, further comprising the step of initiating a transmission of the position information to a server.

11. The method according to claim 8, wherein the defect comprises impairment or soiling of the structural element.

12. The method according to claim 8, wherein the structural element is assigned to a seating place of the vehicle, and wherein the same position information is assigned to a plurality of structural elements.

13. An apparatus comprising:
a processor; and
a computer program, comprising program instructions that cause the processor to execute and/or control the method according to claim 8, when the computer program is running on the processor.

14. An apparatus configured to execute and/or control the method according to claim 8.

15. A vehicle comprising a cladding element according to claim 1.

16. A system comprising an apparatus configured to execute and/or control the method according to claim 8 and a cladding element configured to clad a structural element disposed in a vehicle, the cladding element including a transponder, wherein an item of position information, indicating a position of the structural element, is stored by the transponder.

17. A non-transitory computer-readable medium having program instructions stored thereon, wherein the program instructions cause a processor to execute and/or control the method according to claim 8, when the computer-readable program instructions are running on the processor.

* * * * *